(12) United States Patent
Jang

(10) Patent No.: US 12,375,683 B2
(45) Date of Patent: *Jul. 29, 2025

(54) METHOD AND APPARATUS FOR DERIVING MOTION VECTOR

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,083

(22) Filed: Apr. 26, 2024

(65) Prior Publication Data

US 2024/0275982 A1 Aug. 15, 2024

Related U.S. Application Data

(63) Continuation of application No. 18/128,400, filed on Mar. 30, 2023, now Pat. No. 12,010,323, which is a continuation of application No. 17/275,358, filed as application No. PCT/KR2019/012323 on Sep. 23, 2019, now Pat. No. 11,647,203.

(60) Provisional application No. 62/734,268, filed on Sep. 21, 2018.

(51) Int. Cl.
*H04N 19/137* (2014.01)
*H04N 19/105* (2014.01)
*H04N 19/132* (2014.01)
*H04N 19/176* (2014.01)

(52) U.S. Cl.
CPC ........ *H04N 19/137* (2014.11); *H04N 19/105* (2014.11); *H04N 19/132* (2014.11); *H04N 19/176* (2014.11)

(58) Field of Classification Search
CPC .. H04N 19/137; H04N 19/105; H04N 19/132; H04N 19/176
See application file for complete search history.

(56) References Cited

U.S. PATENT DOCUMENTS

2018/0098063 A1* 4/2018 Chen .................... H04N 19/139
2019/0349588 A1* 11/2019 Chen ...................... H04N 19/33
2020/0007863 A1* 1/2020 Xu ....................... H04N 19/523

* cited by examiner

*Primary Examiner* — Hesham K Abouzahra
(74) *Attorney, Agent, or Firm* — Bryan Cave Leighton Paisner LLP

(57) ABSTRACT

Provided is an image decoding method performed by a decoding apparatus including deriving a temporary reference motion vector for a current block included in a current picture, deriving a reference motion vector for the current block by applying clipping to the temporary reference motion vector, deriving a motion vector for the current block based on the reference motion vector, deriving a predicted block for the current block based on the motion vector for the current block, and generating a reconstructed picture for the current picture based on the predicted block for the current block, wherein a number of bits of a binary code representing the reference motion vector is less than a number of bits of a binary code representing the temporary reference motion vector.

3 Claims, 14 Drawing Sheets decoding apparatus ial Application No. 62/734,268, filed Sep. 21, 2018,
METHOD AND APPARATUS FOR DERIVING MOTION VECTOR

CROSS-REFERENCE TO PRIOR APPLICATIONS

This application is a Continuation of U.S. patent application Ser. No. 18/128,400, filed Mar. 30, 2023; which is a Continuation of U.S. patent application Ser. No. 17/275,358, filed Mar. 11, 2021 and issued May 9, 2023 as U.S. Pat. No. 11,647,203; which is a National Stage of PCT/KR2019/012323, filed Sep. 23, 2019; which claims priority to U.S. Provisional Application No. 62/734,268, filed Sep. 21, 2018, each hereby expressly incorporated by reference in its entirety and each assigned to the assignee hereof.

BACKGROUND OF THE DISCLOSURE

Field of the Disclosure

The present disclosure relates to an image coding technique, and more particularly, to a method and apparatus for deriving a motion vector in an image coding system.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

SUMMARY

The present disclosure provides a method and apparatus for increasing image coding efficiency.

The present disclosure also provides a method and apparatus for deriving a (reference) motion vector.

The present disclosure also provides a method and apparatus for deriving a (reference) motion vector based on clipping.

The present disclosure also provides a method and apparatus for reducing a total number of bits of a binary code representing a (reference) motion vector based on clipping.

The present disclosure also provides a method and apparatus for applying clipping to an affine control point motion vector derived through an affine model.

The present disclosure also provides a method and apparatus for compressing and/or correcting a motion vector which is derived in excess of 16 bits (or 18 bits) during an inter prediction process and storing and/or using the compressed or corrected motion vector.

The present disclosure also provides a method and apparatus for reducing, to 16 bits (or 18 bits) or less, a number of bits of a binary code representing a motion vector which is derived in excess of 16 bits (or 18 bits) during an inter prediction process.

The present disclosure also provides a method and apparatus for controlling motion vector precision.

The present disclosure also provides a method and apparatus for removing the most significant bit (MSB) of a binary code representing a motion vector to control motion vector precision.

The present disclosure also provides a method and apparatus for removing a least significant bit (LSB) of a binary code representing a motion vector to control motion vector precision.

In an aspect, an image decoding method performed by a decoding apparatus is provided. The method may include: deriving a temporary reference motion vector for a current block included in a current picture; deriving a reference motion vector for the current block by applying clipping to the temporary reference motion vector; deriving a motion vector for the current block based on the reference motion vector; deriving a predicted block for the current block based on the motion vector for the current block; and generating a reconstructed picture for the current picture based on the predicted block for the current block, wherein a number of bits of a binary code representing the reference motion vector is less than a number of bits of a binary code representing the temporary reference motion vector.

In another aspect, a decoding apparatus performing image decoding is provided. The decoding apparatus may include: a predictor deriving a temporary reference motion vector for a current block included in a current picture based on a reference candidate of the current block, deriving a reference motion vector for the current block by applying clipping to the temporary reference motion vector, deriving a motion vector for the current block based on the reference motion vector, and deriving a predicted block for the current block based on the motion vector for the current block; and an adder generating a reconstructed picture for the current picture based on the predicted block for the current block, wherein a number of bits of a binary code representing the reference motion vector is less than a number of bits of a binary code representing the temporary reference motion vector.

In another aspect, an image encoding method performed by an encoding apparatus is provided. The method may include: deriving a temporary reference motion vector for a current block included in a current picture based on a reference candidate of the current block; deriving a reference motion vector for the current block by applying clipping to the temporary reference motion vector; deriving a motion vector for the current block based on the reference motion vector; deriving residual samples for the current block based on the motion vector for the current block; and encoding image information including information on the residual samples, wherein a number of bits of a binary code representing the reference motion vector is less than a number of bits of a binary code representing the temporary reference motion vector.

In another aspect, an encoding apparatus performing image encoding is provided. The encoding apparatus may include: deriving a temporary reference motion vector for a current block included in a current picture based on a reference candidate of the current block; deriving a reference motion vector for the current block by applying clipping to the temporary reference motion vector; deriving a motion vector for the current block based on the reference motion vector; deriving residual samples for the current block based on the motion vector for the current block; and encoding image information including information on the residual samples, wherein a number of bits of a binary code representing the reference motion vector is less than a number of bits of a binary code representing the temporary reference motion vector.

Advantageous Effects

According to the present disclosure, overall image/video compression efficiency may be improved.

According to the present disclosure, image coding efficiency may be improved by deriving a (reference) motion vector based on clipping.

According to the present disclosure, image coding efficiency may be increased by reducing a total number of bits of a binary code representing a (reference) motion vector based on clipping.

According to the present disclosure, image coding efficiency may be improved by applying clipping to an affine control point motion vector derived through an affine model.

According to the present disclosure, when a motion vector exceeding 16 bits (or 18 bits) is derived in an inter prediction process, the derived motion vector is compressed and/or corrected and stored and/or used, thereby reducing a memory usage of hardware that applies compression technology to the motion vector and minimizing a reduction in compression performance efficiency that occurs in the process of reducing the memory usage.

DESCRIPTION OF EXEMPLARY EMBODIMENTS

Figure 1:
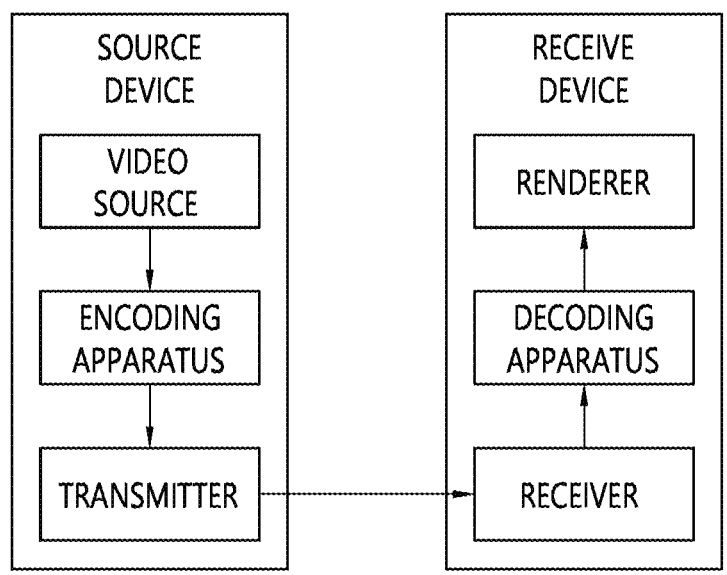
FIG. 1 schematically shows an example of a video/image coding system to which the present disclosure may be applied.

According to an embodiment of the present disclosure, an image decoding method performed by a decoding apparatus is provided. The method may include: deriving a temporary reference motion vector for a current block included in a current picture; deriving a reference motion vector for the current block by applying clipping to the temporary reference motion vector; deriving a motion vector for the current block based on the reference motion vector; deriving a predicted block for the current block based on the motion vector for the current block; and generating a reconstructed picture for the current picture based on the predicted block for the current block, wherein a number of bits of a binary code representing the reference motion vector is less than a number of bits of a binary code representing the temporary reference motion vector.

This disclosure may be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

Hereinafter, exemplary embodiments of this disclosure will be described in detail with reference to the accompanying drawings. Hereinafter, the same reference numerals are used for the same components in the drawings, and redundant description of the same components may be omitted.

FIG. 1 is schematically illustrating a video/image coding system to which this disclosure may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
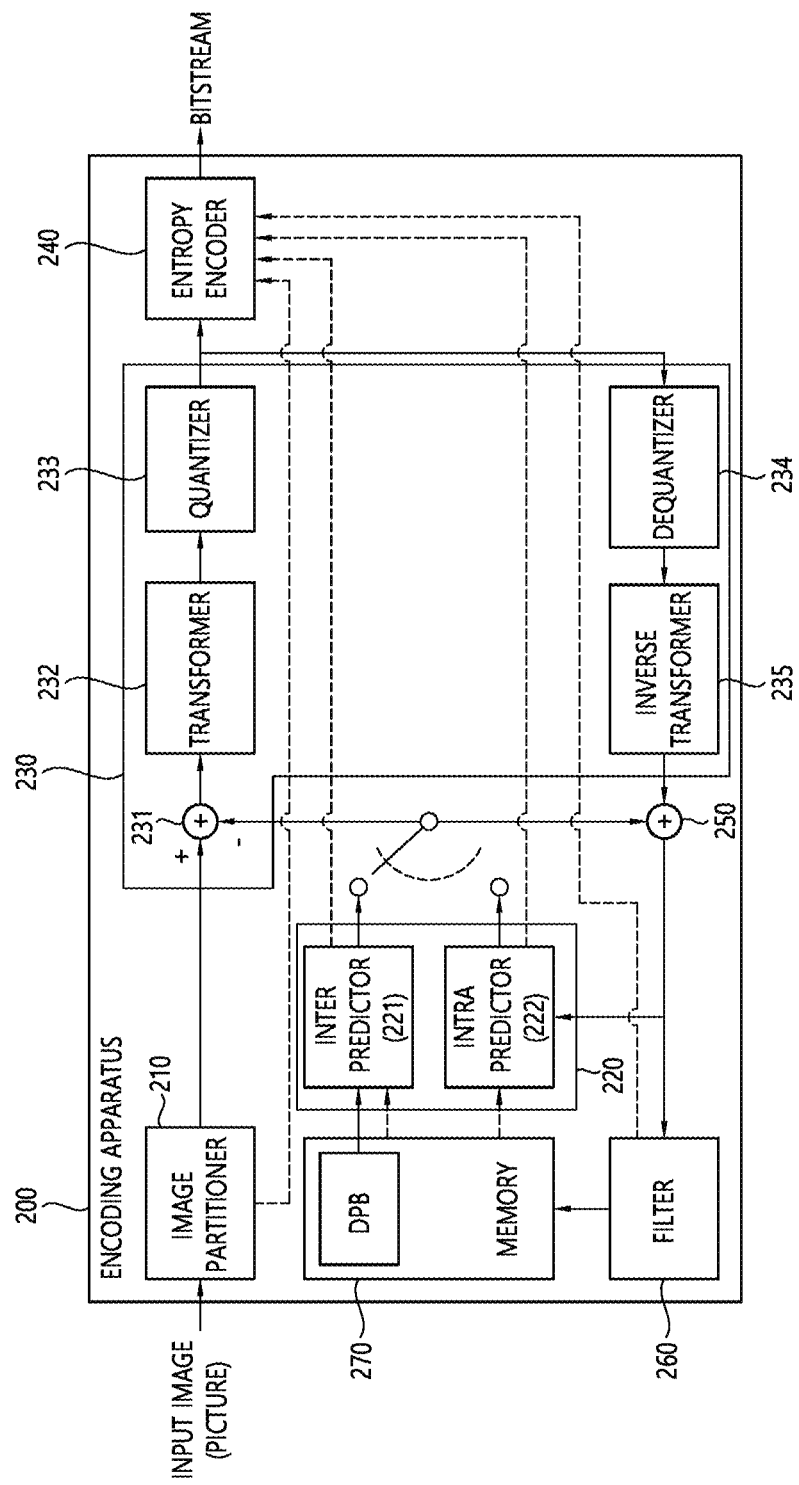
FIG. 2 is a diagram schematically illustrating a configuration of a video/image encoding apparatus to which the present disclosure may be applied.

FIG. 2 is a schematic diagram illustrating a configuration of a video/image encoding apparatus to which the embodiments of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
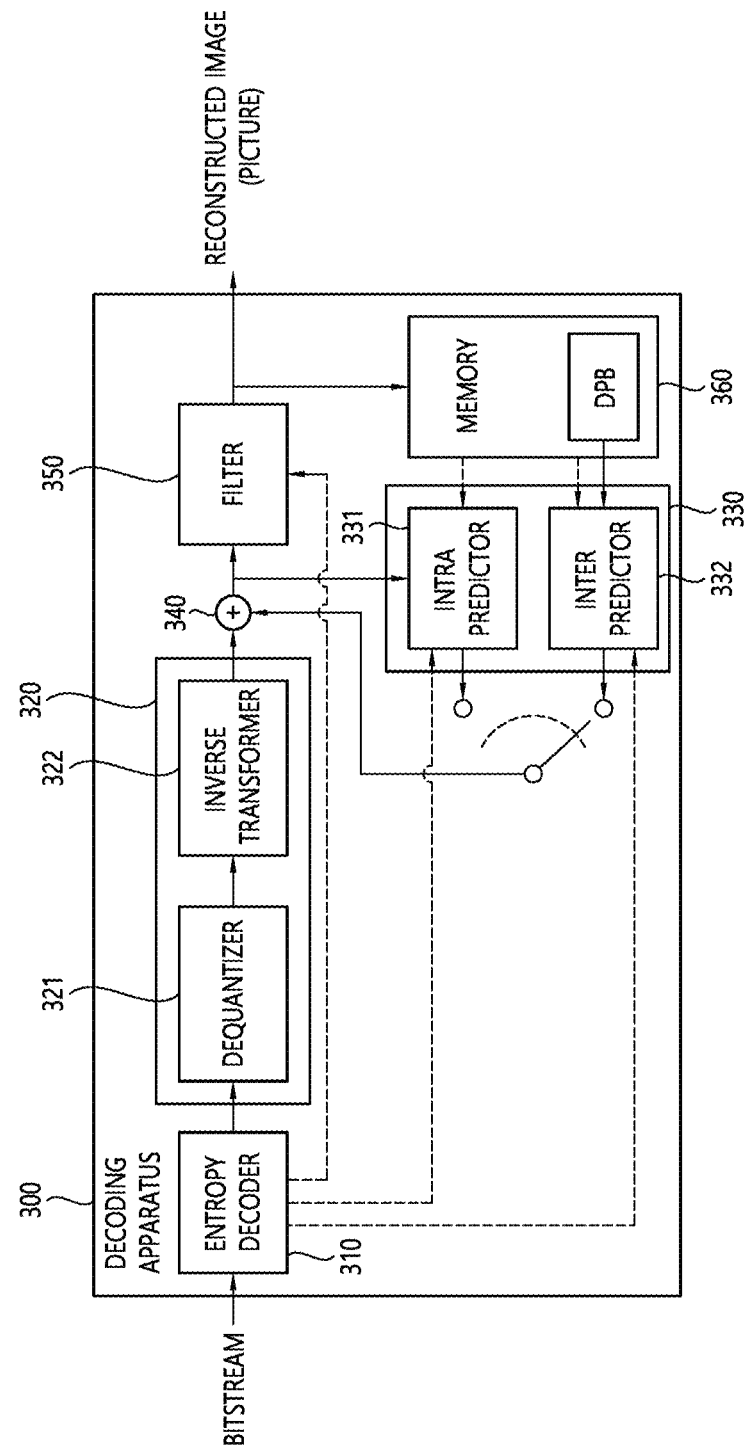
FIG. 3 is a diagram schematically illustrating a configuration of a video/image decoding apparatus to which the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Figure 4:
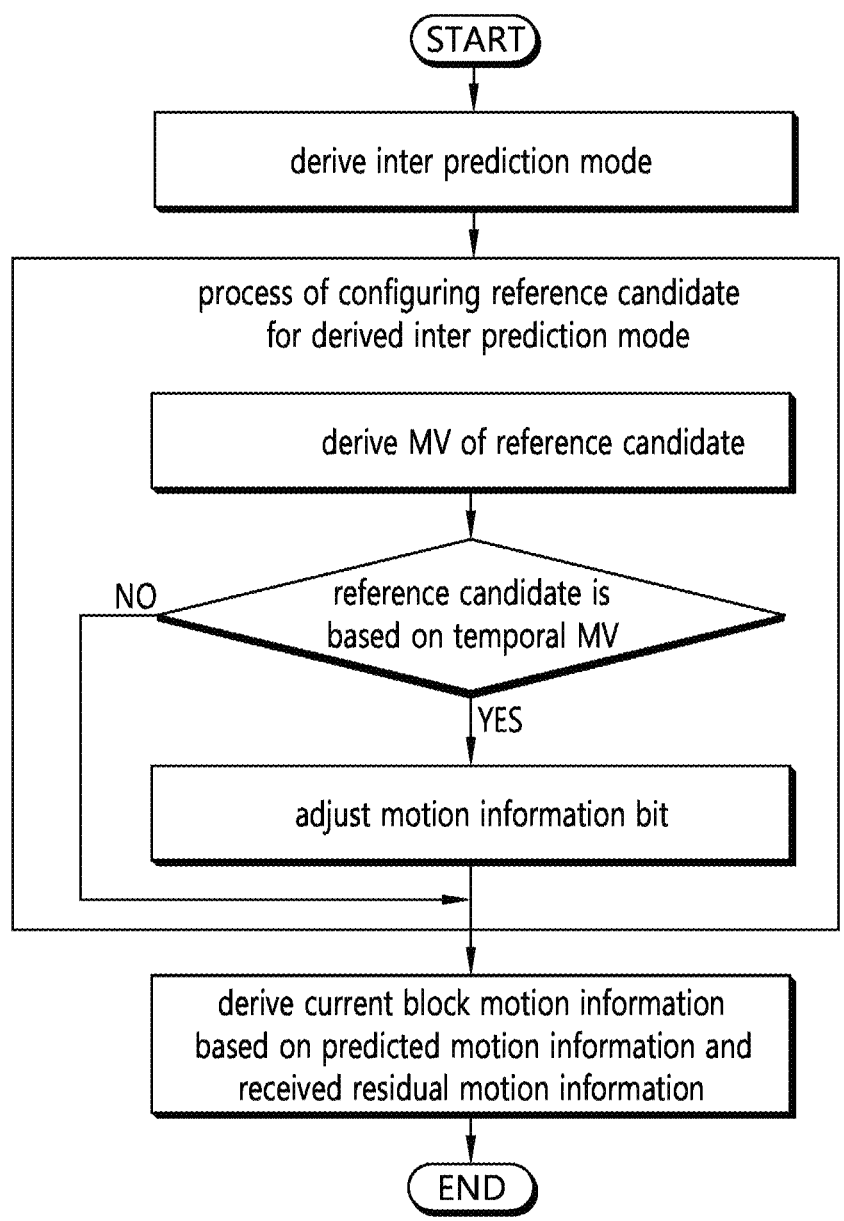
FIG. 4 is a flowchart illustrating a process of applying clipping to a reference motion vector according to an embodiment.

FIG. 4 is a flowchart illustrating a process of applying clipping to a reference motion vector according to an embodiment.

In the process of deriving motion information according to an embodiment, if motion information is expressed up to 1/16-Pel precision like affine prediction, the number of bits representing the motion vector may exceed 16 bits. If a motion vector exceeding 16 bits is expressed, the memory may not be efficiently used or additional memory may need to be used to support the motion vector exceeding 16 bits.

In an embodiment according to the present disclosure, when a motion vector exceeding 16 bits (or 18 bits) is derived during the inter prediction process, the number of bits of the binary code representing the derived motion vector is reduced to 16 bits (or 18 bits) or less, thereby reducing a memory usage of hardware applying a compression technique to the motion vector and minimizing a reduction in compression performance efficiency that occurs in the process of reducing the memory usage.

FIG. 4 is a flowchart illustrating a process of inducing (deriving) motion information of a current block. More specifically, FIG. 4 is a diagram illustrating a process of inducing (deriving) an inter prediction mode, configuring a reference candidate for a current block based on the derived inter prediction mode, and inducing (deriving) motion information of the current block based on predicted motion information and received residual motion information.

Among the steps shown in the flowchart of FIG. 4, in particular, motion information of the reference candidate (or reference motion vector) may be derived based on 16-bit (or 18-bit) clipping in the step of configuring a reference candidate for the current block based on the derived inter prediction mode. More specifically, when motion information is derived based on temporal motion vector (MV) prediction, clipping may be applied to the motion information.

In an embodiment, in the case of using a motion vector of 1/16 pel precision like affine prediction is used, 18 bits or more may be required to express both motion ranges of 4K and 8K images. For example, data of 4096 (horizontal length of image)×16 (considering motion vector precision), that is, 65536=2^16, may be required to express the size of the motion vector of the 4K image in 1/16 pel precision. In addition, data of 8192 (horizontal length of image)×16 (considering motion vector precision), that is, 2^17, may be required to express the size of the motion vector of the 8K image in 1/16 pel precision. In addition, since a sign bit is required to represent a motion vector as a positive or negative number, 2^17 data may be required to represent the motion vector of the 4K image, and 2^18 data may be required to represent the motion vector of the 8K image.

In the process of deriving motion information of the reference candidate according to an embodiment, if the motion information of the reference candidate is based on a temporal motion vector for a temporal neighboring candidate of the current block, motion information of the reference candidate may be derived by compressing and/or changing the temporal motion vector to 16 bits (or 18 bits).

In an example, a method of compressing and/or changing motion information of a reference candidate into 16 bits based on clipping may be performed according to Equation 1 below.

$$mv = Clip3(-32768, 32767, mv') \quad \text{[Equation 1]}$$

In Equation 1, mv' may indicate motion information or a reference motion vector of a reference candidate, and mv may indicate motion information of the reference candidate expressed in 16 bits or the reference motion vector expressed in 16 bits. In some cases, mv', which is a reference motion vector before clipping is performed, may be represented as a temporary reference motion vector, and mv, which is a reference motion vector after clipping is performed, may be represented as a reference motion vector.

In another example, a method of compressing and/or changing motion information of a reference candidate into 18 bits based on clipping may be performed according to Equation 2 below.

$$mv = Clip3(-131072, 131071, mv') \quad \text{[Equation 2]}$$

In Equation 2, mv' may indicate motion information or a reference motion vector of a reference candidate, and mv may indicate motion information of the reference candidate expressed in 18 bits or the reference motion vector expressed in 18 bits. In some cases, mv', which is a reference motion vector before clipping is performed, may be represented as a temporary reference motion vector, and mv, which is a reference motion vector after clipping is performed, may be represented as a reference motion vector.

When the motion information of the reference candidate exceeds 16 bits or 18 bits through Equation 1 or 2, the range of the motion vector may be limited by compression to 16 bits or 18 bits. This may be understood as a method of sequentially removing the bits, starting from an MSB, excluding a bit expressing a sign, from the binary code representing the motion vector.

In an embodiment, motion information may be compressed and/or changed to 16 bits or 18 bits by removing from the least significant bit (LSB) of the motion information (or motion vector).

In an example, a method of compressing motion information expressed in 1/16 pel precision into 1/4 pel precision may be used. Equation 3 below shows an equation for compressing a motion vector of 1/16 pel precision that may be expressed in 18 bits into 16 bits.

$$mv = mv' >> 2 \quad \text{[Equation 3]}$$

In Equation 3, mv' may indicate motion information or a reference motion vector of a reference candidate, and mv may indicate compressed motion information, a compressed reference motion vector, or a shifted reference motion vector of the reference candidate. In some cases, mv', which is a reference motion vector before shifting is performed, may be represented as a temporary reference motion vector, and mv, which is a reference motion vector after shifting is performed, may be represented as a reference motion vector. The definitions for mv and mv' described in Equation 3 may be similarly applied to Equation 4 to Equation 10 below.

In an embodiment, when the motion information is a motion vector of 1/16 pel precision expressed in 18 bits, the LSB 2 bits of the motion information may be removed based on Equation 3 above.

In another embodiment, in the process of removing the LSB 2 bits of the motion vector of 1/16 pel precision represented by 18 bits, an offset may be applied in consideration of a rounding process as shown in Equation 4 below.

$$mv = (mv' + \text{offset}) >> 2 \quad \text{[Equation 4]}$$

In an example, when mv' is greater than 0, the offset is determined as 2, and when mv' is less than 0, the offset is determined as −2, thereby exhibiting a rounding effect in a division operation by a shift operation.

In another embodiment, when the compression technique of the encoding apparatus and/or the decoding apparatus supports 1/16 pel interpolation in the process of generating a predicted sample, the LSB 2 bits may be removed (by applying right shifting by two bits) to change to 1/4 pel precision, and then may be returned to 1/16 pel precision by applying left shifting by 2 bits again, as shown in Equation 5 below.

$$mv = (mv' >> 2) << 2 \quad \text{[Equation 5]}$$

In another embodiment, the LSB 2 bits of (mv'+offset) may be removed (by applying right shifting by 2 bits) to change to 1/4 pel precision, and then may be returned to 1/16 pel precision by applying left shifting by 2 bits again.

$$mv = ((mv' + \text{offset}) >> 2) << 2 \quad \text{[Equation 6]}$$

In another embodiment, a method of removing the LSB of motion information may be generalized as follows. If the current motion information bit is N bits and a target storage bit is M bits, in order to store N bits of information as M bits of information, shifting as much as MShift may be applied using N-M bits as the MShift value. When the generalization according to the present embodiment is applied, Equations 3 to 6 described above may be expressed as Equations 7 to 10 below.

$$mv = mv' >> \text{MShift} \quad \text{[Equation 7]}$$

$$mv = (mv' + \text{offset}) >> \text{MShift} \quad \text{[Equation 8]}$$

$$mv = (mv' >> \text{MShift}) << \text{MShift} \quad \text{[Equation 9]}$$

$$mv = ((mv' + \text{offset}) >> \text{MShift}) << \text{MShift} \quad \text{[Equation 10]}$$

In an embodiment, the offset may be determined as mv'>0 ? MShift>>1: −(MShift>>1).

In an embodiment, a correlation between the MShift and the precision during interpolation may be as follows. When the precision during interpolation is 1/4, the MShift may be 0, when the precision during interpolation is 1/8, the MShift may be 1, when the precision during interpolation is 1/16, the MShift may be 2, and when the precision during interpolation is 1/(2^N), the MShift may be N−2.

Figure 5:
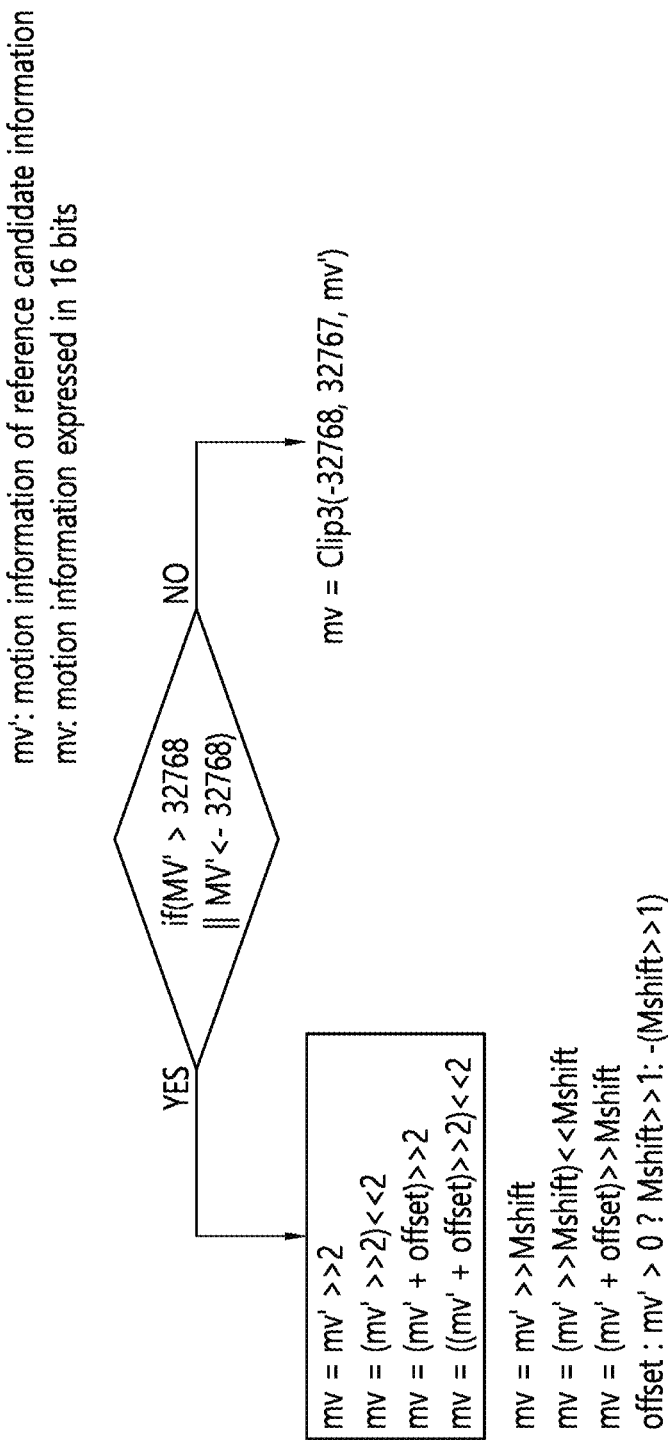
FIG. 5 is a diagram illustrating an example of a method of reducing a number of bits of a binary code representing a reference motion vector.

FIG. 5 is a diagram illustrating an example of a method of reducing the number of bits of a binary code representing a reference motion vector.

In an embodiment, in order to reduce the number of bits of a binary code representing a reference motion vector, the embodiment related to Equation 1 or Equation 2 described above in FIG. 4 and the embodiment related to related to Equations 3 to 10 may be used adaptively. More specifically, in preparation for a worst case in which a size of an image cannot be supported due to a decrease in the expression range of a motion vector, the LSB removing method according to Equation 3 to Equation 10 may be used when mv' exceeds an expression range of Equation 1 or 2, and the MSB removing method according to Equation 1 or Equation 2 may be used when mv' does not exceed the expression range of Equation 1 or 2.

As shown in FIG. 5, if mv' exceeds 32767 (or 32768) or is less than −32768, the operation according to Equations 3 to 10 may be applied, and if mv' is −32768 or more and 32767 (or 32678) or less, the operation according to Equation 1 or Equation 2 may be applied.

In another embodiment, the ranges of 32767 (or 32768), −32768, and the like shown in FIG. 5 may be replaced with 131071, −131072, and the like.

Figure 6:
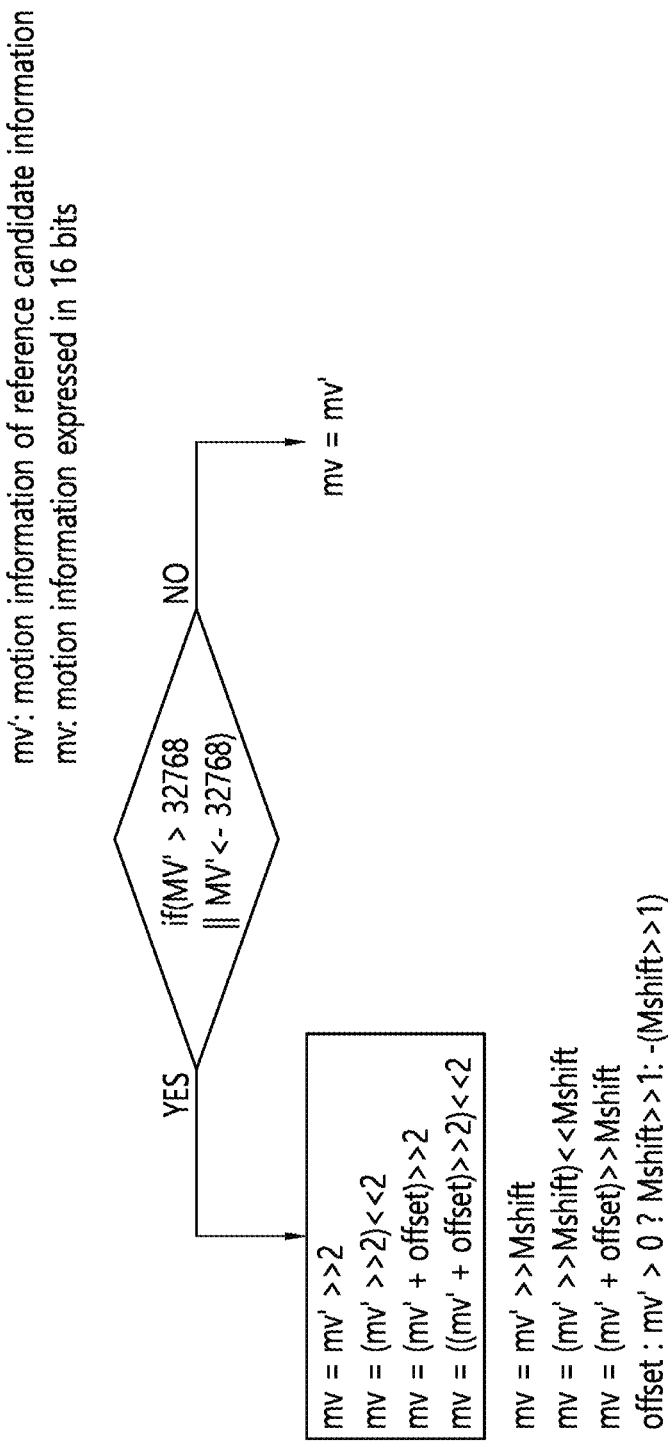
FIG. 6 is a diagram illustrating another example of a method of reducing a number of bits of a binary code representing a reference motion vector.

FIG. 6 is a diagram illustrating another example of a method of reducing the number of bits of a binary code representing a reference motion vector.

In an embodiment disclosed in FIG. 5, it can be seen that, when mv' is −32768 or more and 32767 (or 32768) or less, mv and mv' are determined to be the same even when the operation according to Equation 1 is applied. Therefore, in the embodiment according to FIG. 6, it can be seen that the operation according to Equation 1 above is not applied when mv' is −32768 or more and 32767 (or 32768) or less, In addition, if the clipping-related range of mv' is −131072 or more and 131071 or less, mv and mv' are determined to be the same even when the operation according to Equation 2 is applied, and thus, it can be seen that the operation (clipping operation) according to Equation 2 in FIG. 6 may not be applied.

Figure 7:
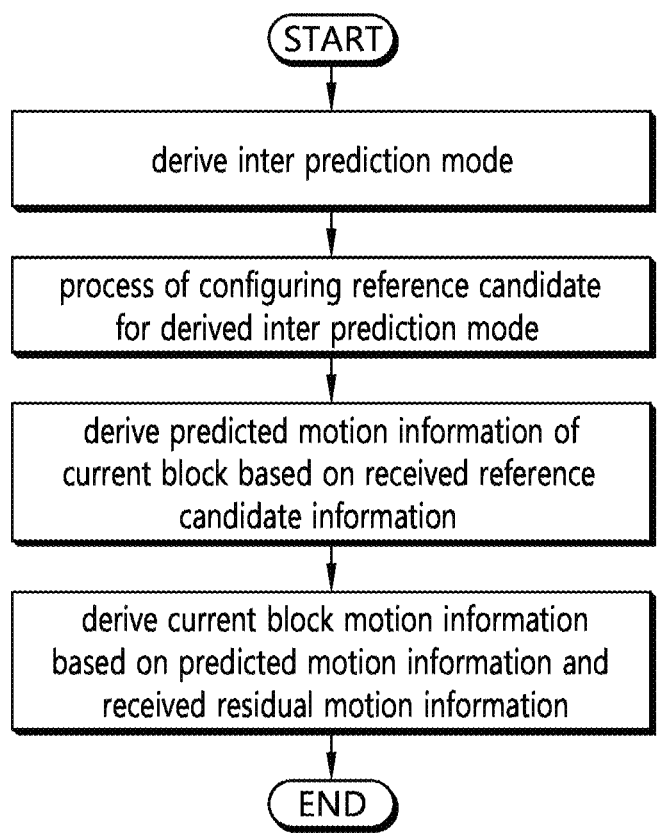
FIG. 7 is a flowchart illustrating a process of applying clipping to a motion vector according to an embodiment.

FIG. 7 is a flowchart illustrating a process of applying clipping to a motion vector according to an embodiment.

In each step of FIG. 7, it is illustrated that an inter prediction mode is derived, a reference candidate for the current block is configured based on the derived inter prediction mode, predicted motion information for the current block is derived based on the received information on the reference candidate, and motion information of the current block is induced (derived) based on the predicted motion information and received residual motion information.

In the embodiment according to FIG. 7, in particular, in the process of deriving predicted motion information for the current block based on the received information on the reference candidate, a motion vector for the current block may be derived based on the vector compression method described above in Equation 1 to Equation 10. A motion vector compressed and/or changed to 16 bits or less or 18 bits or less may be derived based on the clipping method described above in Equation 1 or Equation 2.

In an embodiment, in the process of deriving the reference motion vector and/or the process of deriving the motion vector, Equation 1 to Equation 10 described above may be applied to the following first to third examples. In the first example, the motion vector compression method according to Equation 1 to Equation 10 may be applied in the process of deriving the reference motion vector mv from the temporary reference motion vector mv' as described above in FIG. 4. In the second example, the motion vector compression method according to Equation 1 to Equation 10 may be applied in the process of deriving the motion vector mv from the temporary motion vector mv' as described in FIG. 7. In the third example, the motion vector compression method according to Equation 1 to Equation 10 is applied in the process of deriving the reference motion vector mv from the temporary reference motion vector mv', and the motion vector compression method according to Equation 1 to Equation 10 may be applied in the process of deriving the motion vector mv from the temporary motion vector mv'.

Due to various examples such as the first to third examples, in some cases, motion information of a previously decoded image may be compressed according to Equation 1 to Equation 10, and a motion vector exceeding 16 bits (or exceeding 18 bits) of uncompressed 1/16 pel precision may be used as motion information in a current picture being currently decoded.

Figure 8A:
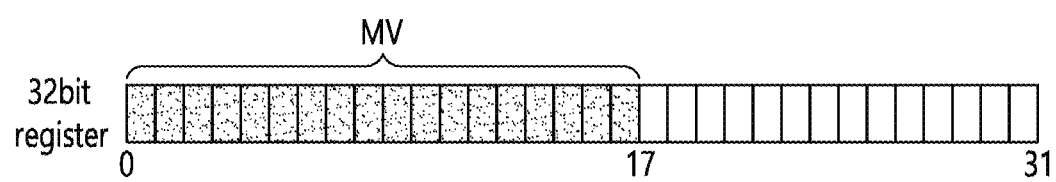
FIGS. 8A and 8B are diagrams illustrating examples of storing information on motion vectors in a 32-bit memory structure according to an embodiment.
Figure 8B:
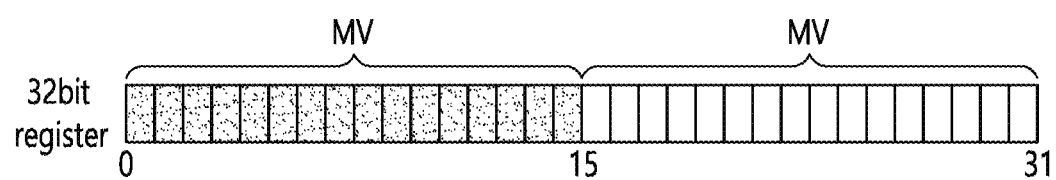

FIGS. 8A and 8B are diagrams illustrating examples of storing information on a motion vector in a 32-bit memory structure according to an embodiment.

According to some of the embodiments described above in FIGS. 4 to 7, while 1/16 pel precision is supported for the H/W architecture, a memory having a structure of power of 2 may be efficiently used by expressing the motion information in 16 bits. For example, when motion information is expressed in 18 bits, stored and used, it may be difficult to efficiently pack data in a memory. FIG. 8A shows an example for storing an 18-bit motion vector in a memory in a 32-bit memory structure. As can be seen in FIG. 8A, since the motion vector is 18 bits, it is necessary to use a 32-bit memory to represent one motion information. According to the example of FIG. 8A, 15 bits of the 32 bits of the memory may be wasted without being used.

If the motion vector is expressed in 16 bits, since two motion vectors may be stored in a 32-bit memory structure as shown in FIG. 8B, the memory waste issue raised in relation to FIG. 8A may be solved.

In an embodiment, a method of deriving a prediction sample with an 18-bit motion vector and subsequently compressing and storing the motion vector in 16 bits may be performed. In another embodiment, the motion vector may be stored in a memory while maintaining it in 18 bits.

Figure 9:
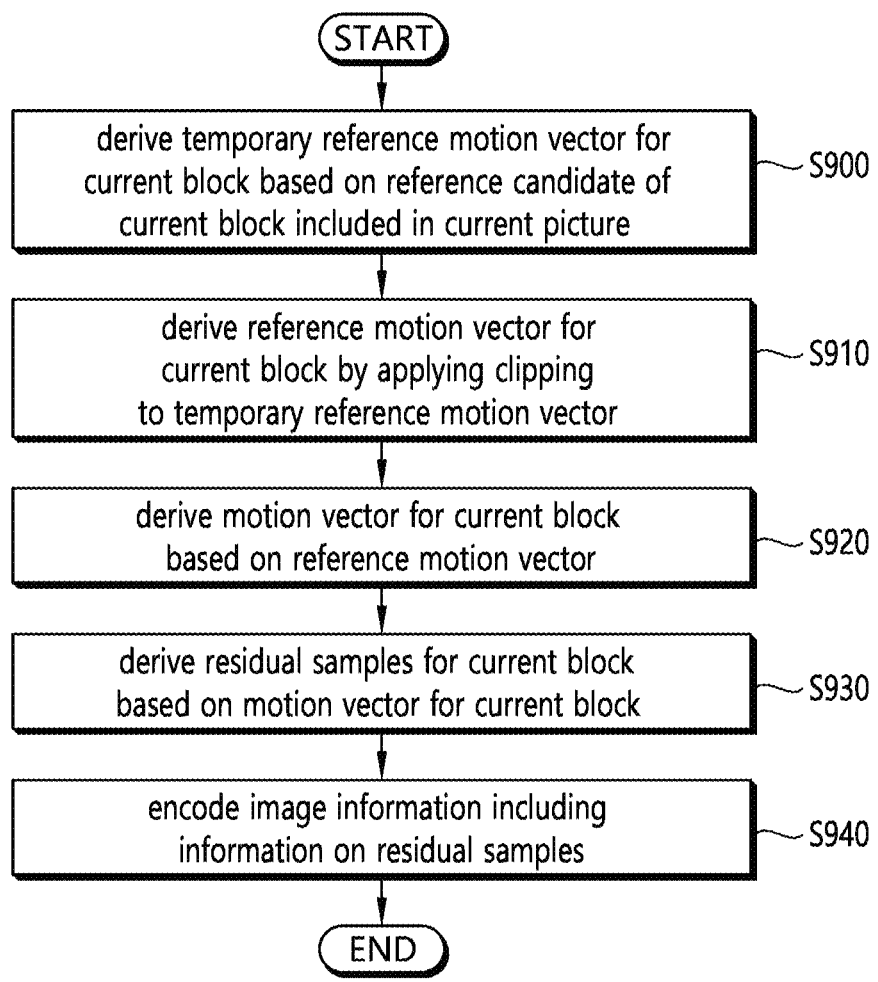
FIG. 9 is a flowchart illustrating an operation of an encoding apparatus according to an embodiment.
Figure 10:
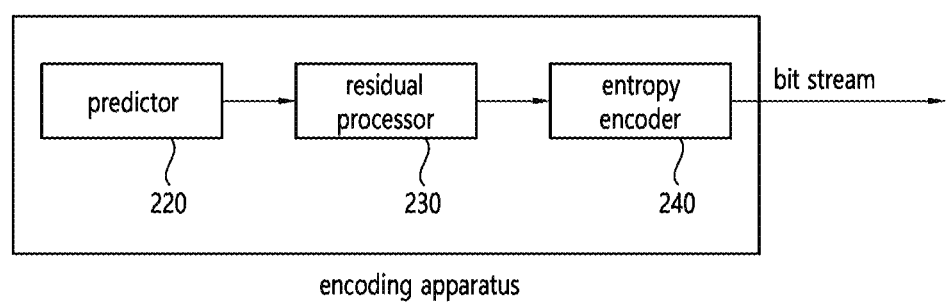
FIG. 10 is a block diagram illustrating a configuration of an encoding apparatus according to an embodiment.

FIG. 9 is a flowchart illustrating an operation of an encoding apparatus according to an embodiment, and FIG. 10 is a block diagram illustrating a configuration of an encoding apparatus according to an embodiment.

Figure 11:
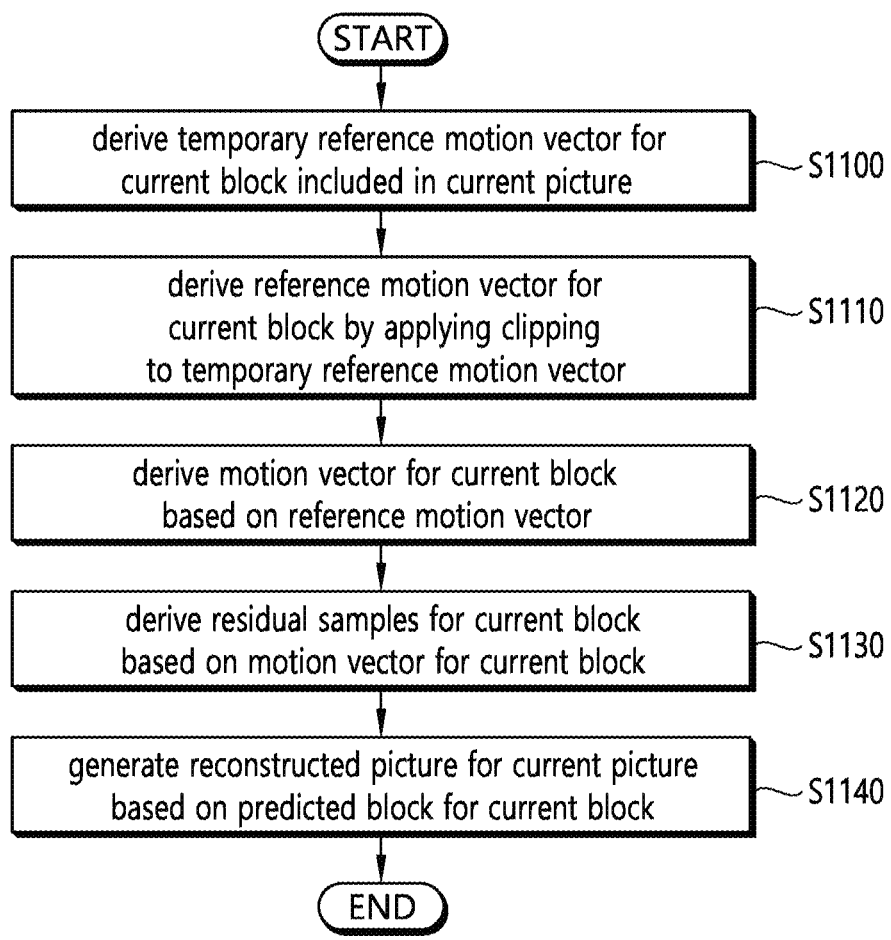
FIG. 11 is a flowchart illustrating an operation of a decoding apparatus according to an embodiment.
Figure 12:
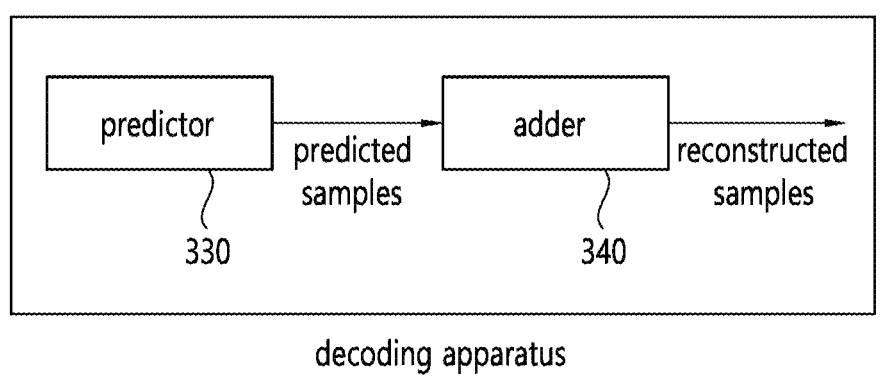
FIG. 12 is a block diagram illustrating a configuration of a decoding apparatus according to an embodiment.

The encoding apparatus according to FIGS. 9 and 10 may perform operations corresponding to the decoding apparatus according to FIGS. 11 and 12. Accordingly, operations of the decoding apparatus to be described later in FIGS. 11 and 12 may be similarly applied to the encoding apparatus according to FIGS. 9 and 10.

Each step disclosed in FIG. 9 may be performed by the encoding apparatus 200 disclosed in FIG. 2. More specifically, steps S900 to S920 may be performed by the predictor 220 disclosed in FIG. 2, S930 may be performed by the residual processor 230 disclosed in FIG. 2, and S940 may be performed by the entropy decoder 240 disclosed in FIG. 2. In addition, operations according to S900 to S940 are based on some of the contents described above in FIGS. 4 to 8B. Accordingly, descriptions of details of the same contents as those described above in FIGS. 2 and 4 to 8B will be omitted or simplified.

As illustrated in FIG. 10, the encoding apparatus according to an embodiment may include the predictor 220, the residual processor 230, and the entropy encoder 230. However, in some cases, none of the components shown in FIG. 10 may be essential components of the encoding apparatus, and the encoding apparatus may be implemented by more or less components than the components shown in FIG. 10.

In the encoding apparatus according to an embodiment, the predictor 220, the residual processor 230, and the entropy encoder 230 may each be implemented as a separate chip or at least two or more components may also be implemented through a single chip.

The encoding apparatus according to an embodiment may derive a temporary reference motion vector for the current block based on a reference candidate of the current block included in a current picture (S900). More specifically, the predictor 220 of the encoding apparatus may derive a temporary reference motion vector for the current block based on a reference candidate of the current block included in the current picture.

The encoding apparatus according to an embodiment may derive a reference motion vector for the current block by applying clipping to the temporary reference motion vector (S910). More specifically, the predictor 220 of the encoding apparatus may derive a reference motion vector for the current block by applying clipping to the temporary reference motion vector.

The encoding apparatus according to an embodiment may derive a motion vector for the current block based on the reference motion vector (S920). More specifically, the predictor 220 of the encoding apparatus may derive a motion vector for the current block based on the reference motion vector.

The encoding apparatus according to an embodiment may derive residual samples for the current block based on the motion vector for the current block (S930). More specifically, the residual processor 230 of the encoding apparatus may derive residual samples for the current block based on the motion vector for the current block.

The encoding apparatus according to an embodiment may encode image information including information on the residual samples (S940). More specifically, the entropy encoder 230 of the encoding apparatus may encode image information including information on the residual samples.

In an embodiment, the number of bits of the binary code representing the reference motion vector may be less than the number of bits of the binary code representing the temporary reference motion vector.

According to the encoding apparatus and the operating method of the encoding apparatus of FIGS. 9 and 10, the encoding apparatus may derive a temporary reference motion vector for the current block based on a reference candidate of the current block included in the current picture (S900), drive a reference motion vector for the current by applying clipping to the temporary reference motion vector (S910), drive a motion vector for the current block based on the reference motion vector (S920), drive residual samples for the current block based on the motion vector for the current block (S930, and encode image information including information on the residual samples (S940), and here, the number of bits of a binary code representing the reference motion vector may be less than the number of binary codes representing the temporary reference motion vector. That is, when a motion vector exceeding threshold bits (e.g., 16 bits or 18 bits) is derived from the inter prediction process, the derived motion vector may be compressed and/or corrected and stored and/or used, thereby reducing a message usage of hardware of applying the compression technology to the motion vector and minimizing a reduction in compression performance efficiency that occurs in the process of reducing the memory usage.

FIG. 11 is a flowchart illustrating an operation of a decoding apparatus according to an embodiment, and FIG. 12 is a block diagram illustrating a configuration of a decoding apparatus according to an embodiment.

Each step disclosed in FIG. 11 may be performed by the decoding apparatus 300 disclosed in FIG. 3. More specifically, steps S1100 to S1130 may be performed by the predictor 330 disclosed in FIG. 3, and S1140 may be performed by the adder 340 disclosed in FIG. 3. In addition, operations according to steps S1100 to S1140 are based on part of the contents described above in FIGS. 4 to 8B. Thus, detailed descriptions of the same contents as those described above in FIGS. 3 to 8B will be omitted or simplified.

As illustrated in FIG. 12, the decoding apparatus according to an embodiment may include the predictor 330 and the adder 340. However, in some cases, not all of the components shown in FIG. 12 may be essential components of the decoding apparatus, and the decoding apparatus may be implemented by more or less components than the components shown in FIG. 12.

In the decoding apparatus according to an embodiment, the predictor 330 and the adder 340 may be implemented as separate chips, or at least two or more components may be implemented through a single chip.

The decoding apparatus according to an embodiment may derive a temporary reference motion vector for a current block included in a current picture (S1100). More specifically, the predictor 330 of the decoding apparatus may derive a temporary reference motion vector for the current block included in the current picture.

The decoding apparatus according to an embodiment may derive a reference motion vector for the current block by applying clipping to the temporary reference motion vector (S1110). More specifically, the predictor 330 of the decoding apparatus may derive a reference motion vector for the current block by applying clipping to the temporary reference motion vector.

The decoding apparatus according to an embodiment may derive a motion vector for the current block based on the reference motion vector (S1120). More specifically, the predictor 330 of the decoding apparatus may derive a motion vector for the current block based on the reference motion vector.

The decoding apparatus according to an embodiment may derive a predicted block for the current block based on the motion vector for the current block (S1130). More specifically, the predictor 330 of the decoding apparatus may derive a predicted block for the current block based on the motion vector for the current block.

The decoding apparatus according to an embodiment may generate a reconstructed picture for the current picture based on the predicted block for the current block (S1140). More specifically, the adder 340 of the decoding apparatus may generate a reconstructed picture for the current picture based on the predicted block for the current block.

In an embodiment, the number of bits of the binary code representing the reference motion vector may be less than the number of bits of the binary code representing the temporary reference motion vector.

In an embodiment, the reference motion vector may be derived based on a temporal neighboring block included in a reference picture of the current picture.

In an embodiment, the reference motion vector may be related to an affine control point motion vector derived based on an affine model.

In an embodiment, the number of bits of the binary code representing the reference motion vector may be 16 or less.

In an embodiment, the number of bits of the binary code representing the reference motion vector may be 18 or less.

In an embodiment, the binary code representing the reference motion vector for the current block may include at least one bit representing a sign of the reference motion vector and at least one bit representing a size of the reference motion vector, and the binary code representing the temporary reference motion vector for the current block may include at least one bit representing a sign of the temporary reference motion vector and at least one bit representing a size of the temporary reference motion vector.

In an embodiment, the at least one bit representing the sign of the reference motion vector and the at least one bit representing the sign of the temporary reference motion vector are the same, and the number of at least one bit representing the size of the reference motion vector may be less than the number of the at least one bit representing the size of the temporary reference motion vector.

In an embodiment, the reference motion vector may be derived based on Equation 11 below, $$mv = Clip3(-32768, 32767, mv') \quad \text{[Equation 11]}$$

In Equation 11, mv' may denote the temporary reference motion vector, and mv may denote the reference motion vector.

In an embodiment, the reference motion vector may be derived based on Equation 12 below, $$mv = Clip3(-2^{17}, 2^{17} - 1, mv') \quad \text{[Equation 12]}$$

In Equation 12, mv' may denote the temporary reference motion vector, and mv may denote the reference motion vector.

In an embodiment, the deriving of the motion vector for the current block may include: deriving a temporary motion vector for the current block based on the reference motion vector and deriving the motion vector for the current block by applying clipping to the temporary motion vector.

In an embodiment, Equation 11 or Equation 12 described above may be applied to the following examples in the process of deriving the reference motion vector and/or the process of deriving the motion vector. In an example, in the process of deriving the reference motion vector mv from the temporary reference motion vector mv', the motion vector compression method according to Equation 11 or 12 may be applied. In another example, in the process of deriving the motion vector mv from the temporary motion vector mv', the motion vector compression method according to Equation 11 or 12 may be applied. In another example, in the process of deriving the reference motion vector mv from the temporary reference motion vector mv', the motion vector compression method according to Equation 11 or 12 may be applied, and in the process of driving the motion vector mv from the temporary motion vector mv', the motion vector compression method according to Equation 11 or Equation 12 may be applied.

In an embodiment, the number of bits of the binary code representing the motion vector for the current block may be 16 or less.

In an embodiment, the number of bits of the binary code representing the motion vector for the current block may be 18 or less.

In an embodiment, the binary code representing the motion vector for the current block may include at least one bit representing a sign of the motion vector and at least one bit representing a size of the motion vector, the binary code representing the temporary motion vector for the current block may include at least one bit representing a sign of the temporary motion vector and at least one bit representing a size of the temporary motion vector, and the at least one bit representing the sign of the motion vector and the at least one bit representing the sign of the temporary motion vector may be the same, and the number of the at least one bit representing the size of the motion vector may be less than the number of at least one representing the size of the temporary motion vector.

According to a decoding apparatus and an operating method of the decoding apparatus disclosed in FIGS. 11 and 12, the decoding apparatus may derive a temporary reference motion vector for a current block included in a current picture (S1100), derive a reference motion vector for the current block by applying clipping to the temporary reference motion vector (S1110), derive a motion vector for the current block based on the reference motion vector (S1120), derive a predicted block for the current block based on the motion vector for the current block (S1130), and generate a reconstructed picture for the current picture based on the predicted block for the current block (S1140), and here, the number of bits of the binary code representing the reference motion vector may be less than the number of bits of the binary code representing the temporary reference motion vector. That is, when a motion vector exceeding threshold bits (for example, 16 bits or 18 bits) is derived in the inter prediction process, the derived motion vector may be compressed and/or corrected and stored and/or used, thereby reducing a memory usage of hardware applying a compression technology to the motion vector and minimizing a reduction in compression performance efficiency that occurs in the process of reducing the memory usage.

In the above-described embodiment, the methods are described based on the flowchart having a series of steps or blocks, but the present disclosure is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software. The encoding apparatus and/or decoding apparatus according to the present disclosure may be included in a device that performs image processing, for example, a TV, a computer, a smartphone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present disclosure may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the present disclosure is applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VOD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the present disclosure is applied may be produced in the form of a computer-executed program, and may be stored in a computer-readable recording medium. The multimedia data having the data structure according to the present disclosure may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment of the present disclosure may be implemented as a computer program product by program code, and the program code may be executed in a computer according to an embodiment of the present disclosure. The program code may be stored on a carrier readable by a computer.

Figure 13:
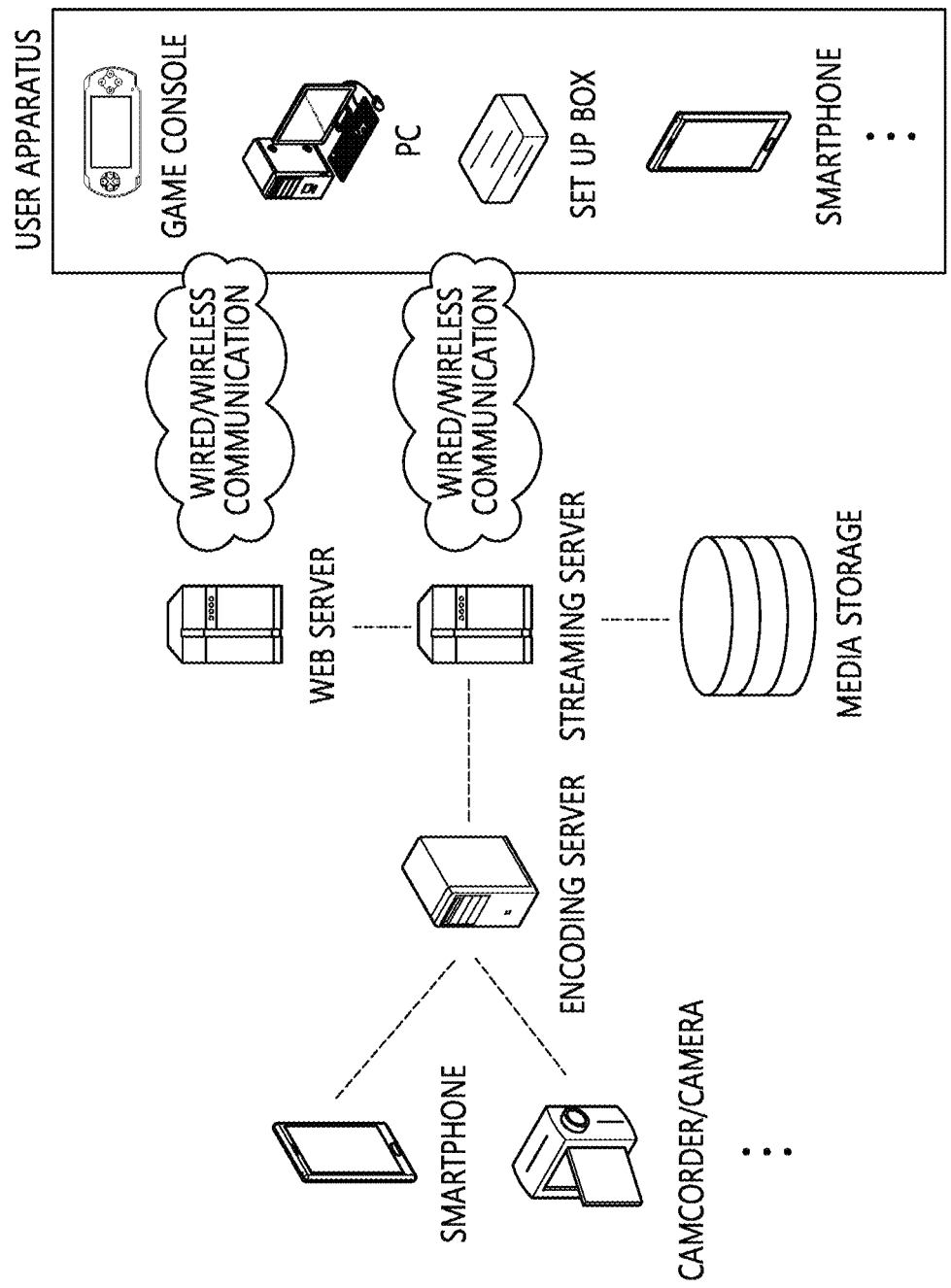
FIG. 13 shows an example of a content streaming system to which the present disclosure may be applied.

FIG. 13 is a diagram illustrating a structure of a content streaming system.

Referring to FIG. 13, the content streaming system to which the present disclosure is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the present disclosure is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

What is claimed is:

1. An image decoding method performed by a decoding apparatus, the image decoding method comprising:
   obtaining image information comprising prediction mode information representing a prediction mode of a current block;
   deriving the prediction mode of the current block as an inter prediction mode based on the prediction mode information;
   deriving a temporary reference motion vector for the current block included in a current picture;
   deriving a reference motion vector for the current block by applying clipping to the temporary reference motion vector;
   deriving a motion vector for the current block based on the reference motion vector; and
   deriving prediction samples for the current block based on the motion vector for the current block;
   wherein the reference motion vector is derived based on an equation below, $$mv = Clip3(-2^\wedge 17, 2^\wedge 17 - 1, mv'),$$

and
   wherein the mv' in the equation represents the temporary reference motion vector, and the mv represents the reference motion vector.

2. An image encoding method performed by an encoding apparatus, the image encoding method comprising:
   deriving a prediction mode of a current block as an inter prediction mode;
   deriving a temporary reference motion vector for the current block included in a current picture;
   deriving a reference motion vector for the current block by applying clipping to the temporary reference motion vector;
   deriving a motion vector for the current block based on the reference motion vector;
   deriving prediction samples for the current block based on the motion vector for the current block; and
   encoding image information including prediction mode information representing the prediction mode of the current block,
   wherein the reference motion vector is derived based on an equation below, $$mv = Clip3(-2^\wedge 17, 2^\wedge 17 - 1, mv'),$$

and
   wherein the mv' in the equation represents the temporary reference motion vector, and the mv represents the reference motion vector.

3. A transmission method of data for an image, the transmission method comprising:
   obtaining a bitstream for the image, wherein the bitstream is generated based on deriving a prediction mode of a current block as an inter prediction mode, deriving a temporary reference motion vector for the current block included in a current picture, deriving a reference motion vector for the current block by applying clipping to the temporary reference motion vector, deriving a motion vector for the current block based on the reference motion vector, deriving prediction samples for the current block based on the motion vector for the current block and encoding image information including prediction mode information representing the prediction mode of the current block; and
   transmitting the data comprising the bitstream,
   wherein the reference motion vector is derived based on an equation below, $$mv = Clip3(-2^\wedge 17, 2^\wedge 17 - 1, mv'),$$

and
   wherein the mv' in the equation represents the temporary reference motion vector, and the mv represents the reference motion vector.

* * * * *